(12) United States Patent
Liu et al.

(10) Patent No.: US 10,182,133 B2
(45) Date of Patent: Jan. 15, 2019

(54) METHOD AND DEVICE FOR STARTING APPLICATION

(71) Applicant: Xiaomi Inc., Beijing (CN)

(72) Inventors: Tiejun Liu, Beijing (CN); Zheng Li, Beijing (CN); Liang Cheng, Beijing (CN); Pengfei Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 603 days.

(21) Appl. No.: 14/870,622

(22) Filed: Sep. 30, 2015

(65) Prior Publication Data

US 2016/0173658 A1 Jun. 16, 2016

Related U.S. Application Data

(63) Continuation of application No. PCT/CN2015/080808, filed on Jun. 4, 2015.

(30) Foreign Application Priority Data

Dec. 15, 2014 (CN) .......................... 2014 1 0778277

(51) Int. Cl.
*G06F 15/173* (2006.01)
*H04L 29/06* (2006.01)
*H04W 4/50* (2018.01)
*H04L 29/12* (2006.01)

(52) U.S. Cl.
CPC ............... *H04L 69/24* (2013.01); *H04W 4/50* (2018.02); *H04L 61/2015* (2013.01)

(58) Field of Classification Search
CPC . H04L 69/24; H04L 61/2076; H04L 61/6009; H04L 61/2015; H04W 4/50
See application file for complete search history.

(56) References Cited

U.S. PATENT DOCUMENTS

| | | | |
|---|---|---|---|
| 8,724,639 B2 | 5/2014 | Mahmoud | |
| 2002/0049930 A1 | 4/2002 | Hannigan | |
| 2003/0189928 A1* | 10/2003 | Xiong | ................. H04L 61/2015 370/389 |
| 2011/0211584 A1 | 9/2011 | Mahmoud | |
| 2012/0257621 A1* | 10/2012 | Ishii | .................... H04L 41/0853 370/389 |

(Continued)

FOREIGN PATENT DOCUMENTS

| | | |
|---|---|---|
| CN | 102821359 A | 12/2012 |
| CN | 103581712 A | 2/2014 |

(Continued)

OTHER PUBLICATIONS

International Search Report of PCT Application No. PCT/CN2015/080808, dated Sep. 25, 2015, issued by the State Intellectual Property Office of P.R. China as ISA (5 pages).

(Continued)

*Primary Examiner* — Cheikh T Ndiaye

(74) *Attorney, Agent, or Firm* — Finnegan, Henderson, Farabow, Garrett & Dunner LLP

(57) ABSTRACT

A method for starting an application in a router includes establishing a connection with a terminal, detecting whether the terminal supports a private protocol, and starting an application based on the private protocol if the terminal supports the private protocol.

9 Claims, 3 Drawing Sheets

(56) References Cited

U.S. PATENT DOCUMENTS

| | | | | |
|---|---|---|---|---|
| 2012/0259966 A1* | 10/2012 | Ishii | ................ | H04L 41/0853 709/223 |
| 2013/0012179 A1* | 1/2013 | Watkins | ................ | H04L 67/34 455/418 |
| 2013/0250801 A1* | 9/2013 | Kennedy | ............ | H04L 41/0806 370/254 |

FOREIGN PATENT DOCUMENTS

| | | |
|---|---|---|
| CN | 103942080 A | 7/2014 |
| CN | 103945458 A | 7/2014 |
| CN | 104065661 A | 9/2014 |
| CN | 104166396 A | 11/2014 |
| CN | 104539548 A | 4/2015 |
| JP | 2005-501478 | 1/2005 |
| KR | 10-2008-0024248 | 3/2008 |
| KR | 10-2010-0021637 | 2/2010 |
| RU | 2448422 C2 | 4/2012 |
| RU | 2480934 C2 | 4/2013 |
| WO | WO 2008/127905 A2 | 10/2008 |
| WO | WO 2008127905 A2 * | 10/2008 ............. G08C 17/02 |

OTHER PUBLICATIONS

Alexander S., et al."DHCP Options and BOOTP Vendor Extensions," Network Working Group—Standard Track, dated Mar. 1997.

Bustamante, M.L., "Hosting WCF Services," CODE Magazine, Issue: Jan./Feb. 2007, retrieved from http://www.codemag.com/article/0701041.

Extended European Search Report issued in European Patent Application No. 15199704.6, mailed from the European Patent Office, dated Mar. 23, 2016.

Russian Office Action issued in Russian Patent Application No. 2015129673/08(045842), dated Nov. 8, 2016.

English version of International Search Report of PCT Application No. PCT/CN2015/080808, dated Sep. 25, 2015, issued by the State Intellectual Property Office of P.R. China as ISA.

* cited by examiner

METHOD AND DEVICE FOR STARTING APPLICATION

CROSS-REFERENCE TO RELATED APPLICATIONS

This application is a continuation of International Publication No. PCT/CN2015/080808, filed Jun. 4, 2015, which is based upon and claims priority to Chinese Patent Application No. 201410778277.7, filed Dec. 15, 2014, the entire contents of both of which are incorporated herein by reference.

TECHNICAL FIELD

The present disclosure generally relates to computer technologies and, more particularly, to a method and a device for starting an application.

BACKGROUND

Routers usually have applications stored therein. These applications are based on protocols, such as standard protocols and private protocols. Each type of applications provides services for terminals supporting the corresponding protocol.

According to conventional technologies, after a router starts, the router automatically starts all of the applications, whether they are based on the standard protocols or the private protocols. Thus, after a connection with a terminal is established, the router can determine a protocol supported by the terminal, and provide services for the terminal using the application corresponding to that protocol.

SUMMARY

In accordance with the present disclosure, there is provided a method for starting an application in a router includes establishing a connection with a terminal, detecting whether the terminal supports a private protocol, and starting an application based on the private protocol if the terminal supports the private protocol.

Also in accordance with the present disclosure, there is provided a router including a processor and a memory storing instructions that, when executed by the processor, cause the processor to establish a connection with a terminal, detect whether the terminal supports a private protocol, and start an application based on the private protocol if the terminal supports the private protocol.

Also in accordance with the present disclosure, there is provided a non-transitory computer-readable storage medium storing instructions that, when executed by a processor in a router, cause the router to establish a connection with a terminal, detect whether the terminal supports a private protocol, and start an application based on the private protocol if the terminal supports the private protocol.

The technical solutions provided by the embodiments of the present disclosure may in part, mitigate the problem of wasting memory in the router caused by operating an application based on a private protocol when no connection between the router and a terminal supporting the private protocol is established, and thus achieve the effect of saving memory of the router.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the invention as recited in the appended claims. Methods and devices consistent with embodiments of the present disclosure can be implemented, for example, in a router.

Figure 1:
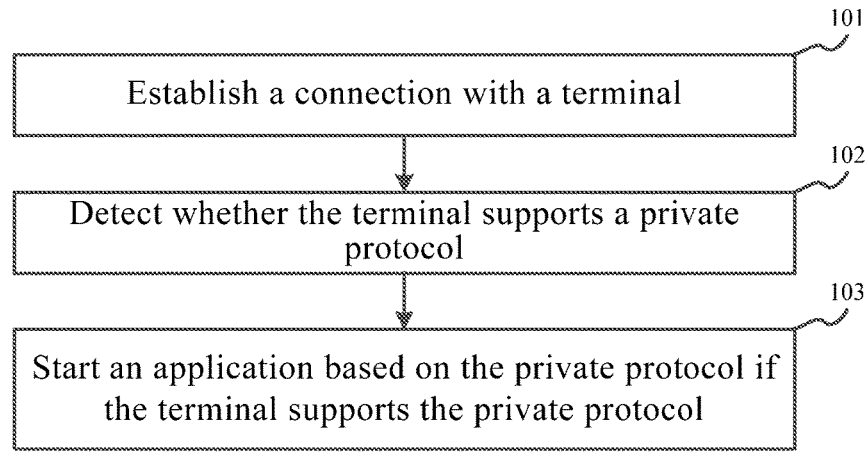
FIG. 1 is a flow chart of a method for starting an application, according to an exemplary embodiment.

FIG. 1 is a flow chart of a method for starting an application, according to an exemplary embodiment. As shown in FIG. 1, at 101, a connection with a terminal is established. At 102, whether the terminal supports a private protocol is detected. At 103, if the terminal supports the private protocol, an application based on the private protocol is started. Hereinafter, an application based on a private protocol is also referred to as a "private-protocol-based application."

According to the exemplary method shown in FIG. 1, the private-protocol-based application can be started after the connection with the terminal supporting the private protocol is established. This mitigates the problem of wasting memory in the router caused by operating the private-protocol-based application when no connection between the router and the terminal supporting the private protocol is established, and thus achieves the effect of saving memory of the router.

Figure 2:
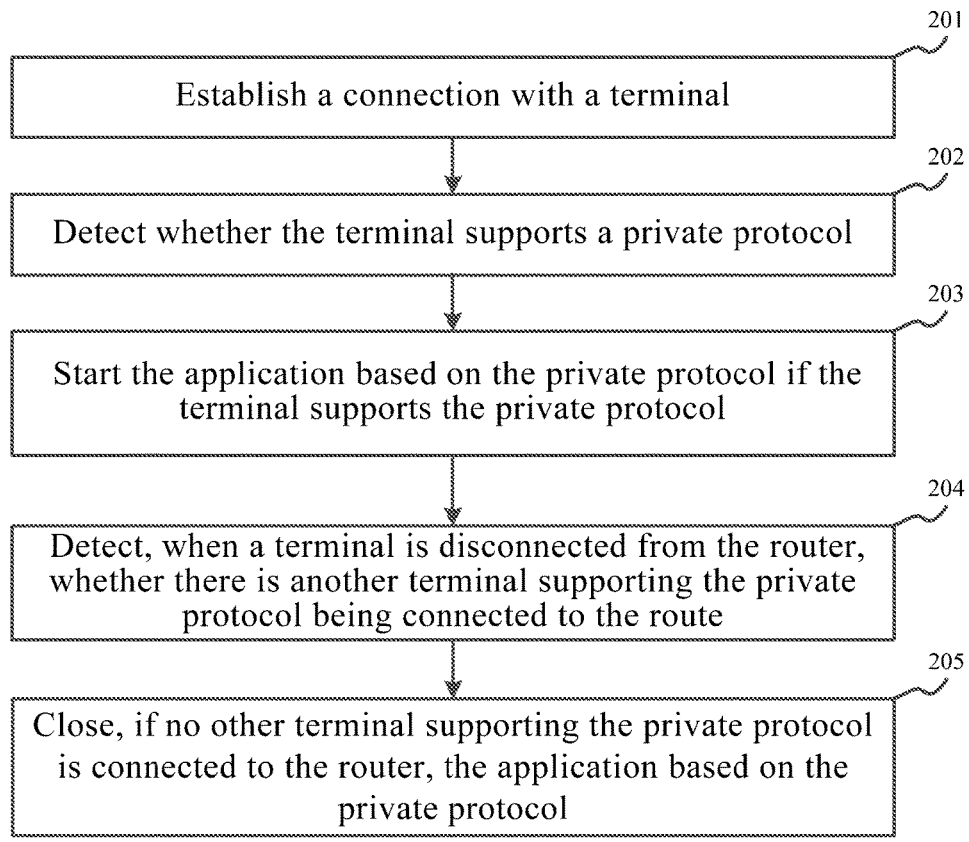
FIG. 2 is a flow chart of a method for starting an application, according to another exemplary embodiment.

FIG. 2 is a flow chart of a method for starting an application, according to another exemplary embodiment. As shown in FIG. 2, at 201, a connection between a router and a terminal is established. The terminal may be an electronic apparatus supporting standard protocols, or may be an electronic apparatus supporting standard protocols and private protocols. For example, a standard protocol is generally a protocol widely used by different manufacturers, such as a Server Messages Block (SMB) protocol or a Digital Living Network Alliance (DLNA) protocol. The terminal supporting standard protocols may be a personal computer, a TV, a network set-top box, or the like. Also for example, a private protocol is generally a protocol used in a local range by particular manufacturer(s), such as a proprietary protocol. For example, a particular router manufacturer and a particular TV manufacturer cooperate and develop a private protocol, which is only used between routers by the particular router manufacturer and TVs by the particular TV manufacturer. In this example, each TV is a terminal supporting the standard protocol and the private protocol.

In exemplary embodiments, after starting, the router receives a connection establishing request sent by the terminal The router then assigns an Internet Protocol (IP) address for the terminal by, e.g., a Dynamic Host Configuration Protocol (DHCP), and sends the IP address to the terminal, so as to complete the procedure of establishing the connection with the terminal Usually, terminals establishing connections with the router will call applications based on standard protocols. Therefore, after the router is started, the router also starts the applications based on the standard protocols, such that the applications based on the standard protocols can directly provide services for connected terminals. For example, for the SMB protocol, the application based thereon can be a samba application. Also for example, for the DLNA protocol, the application based thereon can be a DLNA application.

At 202, the router detects whether the terminal supports a private protocol. The router may have a limited amount of memory. If the router is not connected with a terminal supporting the private protocol, then starting and operating the application based on the private protocol will waste the memory of the router. To reserve the memory, the router only starts the application based on the private protocol after establishing a connection with the terminal supporting the private protocol. As such, starting of the router can be accelerated, and the memory of the router can be saved. The private-protocol-based application may be, for example, mediaservice or the like.

In some embodiments, after a connection is established between the router and the terminal, the router also detects whether the terminal supports the private protocol. When the router establishes a connection with the terminal, the router acquires and adds a host name of the terminal to a DHCP configuration file. To detect whether the terminal supports the private protocol, the router reads the host name of the terminal from the DHCP configuration file, and detects whether a preset name list includes a host type matching the host name. The name list stores host types of terminals supporting the private protocol. If the name list includes the host type matching the host name of the terminal, the router determines that the terminal supports the private protocol.

For instance, the DHCP configuration file is /tmp/dhcp.leases, which stores the following information of several terminals:

43200 10:48:b1:2c:28:41 192.168.31.149 MiTV2-242bdb61b8e78f35*

43200 98:3b:16:a4:e3:5d 192.168.31.223 MiBOX2-cd777958149c13cd*

43200 8c:be:be:70:02:69 192.168.31.217 MI3W-xiaomishoujiltj*

In this example, the host name of the first terminal is MiTV2-242bdb61b8e78f35, the host name of the second terminal is MiBOX2-cd777958149c13cd, and the host name of the third terminal is MI3W-xiaomishoujiltj.

In some embodiments, the router may acquire the host names of the terminals supporting the private protocol in advance, and add these host names into the name list. After acquiring the host name of the terminal connected to the router, the router detects whether the name list includes the acquired host name. If the router detects that the name list includes the acquired host name, it is determined that the terminal supports the private protocol. If the router detects that the name list does not include the acquired host name, it is determined that the terminal does not support the private protocol.

For example, MiTV2-242bdb61b8e78f35 and MiBOX2-cd777958149c13cd are stored in the name list in the router. When the host name read from the DHCP configuration file by the router is MiTV2-242bdb61b8e78f35, the router detects that the name list includes the host name, and determines that the terminal supports the private protocol.

Generally, one private protocol may be supported by at least one type of terminals. Storing the host names of all the terminals of a certain type in the name list may occupy a large amount of memory of the router. As a result, the detection efficiency may be relatively low. Since a host name generally includes a host type and a serial number, the router may extract the host type from the host name and add the host type into the name list. Accordingly, the name list stores the host types of the terminals supporting the private protocol.

In this scenario, after reading the acquired host name of the connected terminal, the router exacts the host type of the terminal from the acquired host name, and detects whether the host type exists in the name list. If the router detects that the host type exists in the name list, it is determined that the name list includes the host type matching the acquired host name, and that the terminal supports the private protocol. If the router detects that the host type does not exist in the name list, it is determined that the name list does not include the host type matching the acquired host name, and that the terminal does not support the private protocol.

For example, MiTV2 and MiBOX2 are stored in the name list in the router. When the host name read by the router from the DHCP configuration file is MiTV2-242bdb61b8e78f35, the host type exacted from the host name is MiTV2. This host type exists in the name list and, therefore, it is determined that the terminal supports the private protocol.

In some embodiments, the router reads the host names from the DHCP configuration file every predetermined time period, and detects whether the terminals connected with the router support the private protocol according to the host names. In some embodiments, when receiving a connection event, the router reads the host name from the DHCP configuration file, and detects whether the connected terminal supports the private protocol according to the host name.

At 203, if the router detects that the terminal connected to the router supports the private protocol, the router starts an application based on the private protocol. If the router detects that the terminal does not support the private protocol, the procedure ends.

When there is only one private-protocol-based application in the router, the router directly starts that private-protocol-based application. When there are at least two private-protocol-based applications, the router needs to determine which one of the two private-protocol-based applications is based on the private protocol supported by the terminal That is, the router does not start private-protocol-based application(s) that are based on a private protocol not supported by the terminal, so as to avoid wasting memory resources.

If the router has at least two name lists and each name list corresponds to at least one private-protocol-based application, to start the correct private-protocol-based application, the router first determines a name list to which the acquired host name belongs, and then determines and starts at least one private-protocol-based application corresponding to the name list. For example, after determining that the terminal supports a private protocol, the router also determines the host type of the terminal According to the host type, the router determines a name list including the host type. The router then determines an application based on the private protocol supported by the terminal according to the name list and the corresponding relationship between name lists and private-protocol-based applications.

At 204, when a connected terminal is disconnected from the router, the router detects whether there is another terminal supporting the private protocol that is connected to the router. If the router detects that no other terminal supporting the private protocol is connected to the router, the router closes the application based on the private protocol (at 205), since continuing to run that application in this scenario would waste the memory resources of the router. On the other hand, if the router detects that at least one other terminal supporting the private protocol is connected to the router, the router leaves open the application based on the private protocol.

In some embodiments, after a terminal is disconnected from the router, the router deletes the host name of the disconnected terminal from the DHCP configuration file. Thus, if the router needs to detect whether a terminal is disconnected, the router can read the host names of all the terminals in the DHCP configuration file, determine the host names that are missing in the current reading as compared to the last reading, and determine the terminals indicated by respective missing host names to be the disconnected terminals.

In some embodiments, if the terminal in the process of 204 is the same terminal supporting the private protocol in the process of 203, then the process of 204 can be performed after the process of 203. On the other hand, if the terminal in the process of 204 supports the private protocol but is not the terminal in the process of 203, then the process of 204 can be performed before or after the processes of 201-203.

At 205, when the router detects that no other terminal supporting the private protocol is connected to the router, the router closes the application based on the private protocol.

In some embodiments, the processes of 202 to 205 may be implemented as an application management script in the router. After the router is started, the router automatically operates the application management script.

In addition to the benefits achieved by the exemplary method shown in FIG. 1, according to the exemplary method shown in FIG. 2, the private-protocol-based application can be closed when the router is not connected with any terminal supporting the private protocol, and thus the memory of the router is further saved.

Figure 3:
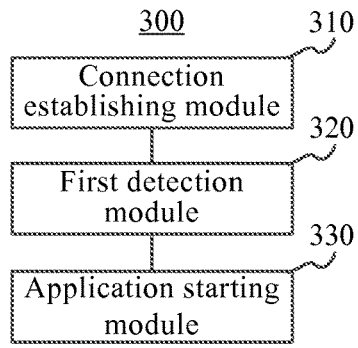
FIG. 3 is a block diagram of a device for starting an application, according to an exemplary embodiment.

FIG. 3 is a block diagram of a device 300 for starting an application, according to an exemplary embodiment. As shown in FIG. 3, the device 300 includes a connection establishing module 310, a first detection module 320, and an application starting module 330. The connection establishing module 310 is configured to establish a connection with a terminal The first detection module 320 is configured to detect whether the terminal supports a private protocol. The application starting module 330 is configured to start an application based on the private protocol if the first detection module 320 detects that the terminal supports the private protocol.

With the exemplary device 300, the private-protocol-based application can be started after the connection with the terminal supporting the private protocol is established. This mitigates the problem of wasting memory in the router caused by operating the private-protocol-based application when no connection between the router and the terminal supporting the private protocol is established, and thus achieves the effect of saving memory of the router.

Figure 4:
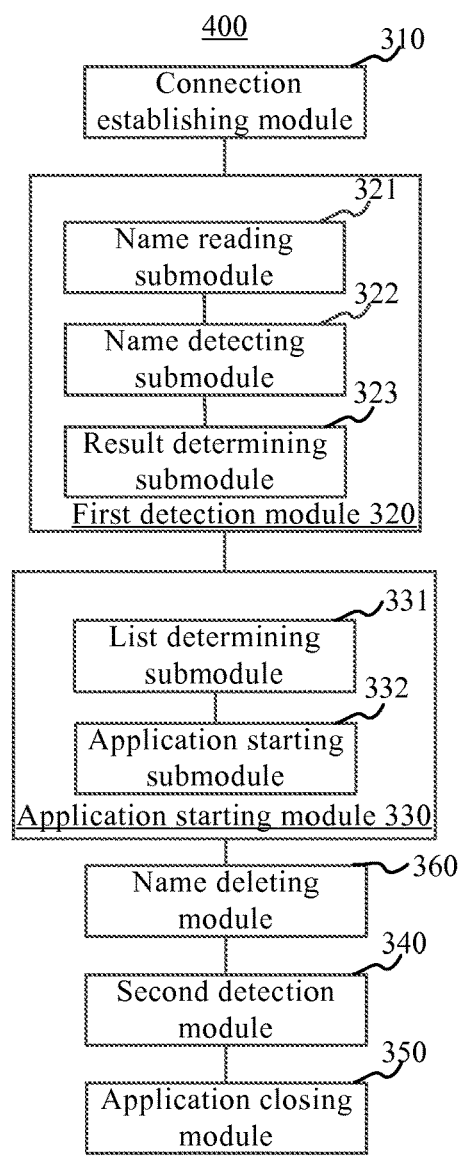
FIG. 4 is a block diagram of a device for starting an application, according to another exemplary embodiment.

FIG. 4 is a block diagram of a device 400 for starting an application, according to another exemplary embodiment. As shown in FIG. 4, the device 400 includes the connection establishing module 310, the first detection module 320, the application starting module 330, a second detection module 340, an application closing module 350, and a name deleting module 360. The second detection module 340 is configured to, when a terminal supporting a private protocol is disconnected from the router, detect whether there is another terminal supporting the private protocol is connected to the router. The application closing module 350 is configured to close the application based on the private protocol when the second detection module 340 detects that no other terminal supporting the private protocol is connected to the router. The name deleting module 360 is configured to delete a host name of a disconnected terminal from a DHCP configuration file when the terminal is disconnected from the router.

In some embodiments, the first detection module 320 includes a name reading submodule 321, a name detecting submodule 322, and a result determining submodule 323. The name reading submodule 321 is configured to read the host name of a terminal connected to the router from the DHCP configuration file. The host name is acquired and added to the DHCP configuration file when the router establishes a connection with the terminal The name detecting submodule 322 is configured to detect whether a preset name list includes a host type matching the host name read by the name reading submodule 321. The name list stores host types of terminals supporting the private protocol. The result determining submodule 323 is configured to determine that the terminal supports the private protocol if the name list includes the host type matching the host name.

In some embodiments, as shown in FIG. 4, the application starting module 330 includes a list determining submodule 331 and an application starting submodule 332. The list determining submodule 331 is configured to, in the situation where there are at least two name lists and each name list corresponds to at least one private-protocol-based application, determine a name list to which the matching host type belongs. The application starting submodule 332 is configured to determine and start at least one private-protocol-based application corresponding to the name list determined by the list determining submodule 331.

In addition to the benefits achieved by the exemplary device 300, with the exemplary device 400, the private-protocol-based application can be closed when the router is not connected with any terminal supporting the private protocol, and thus the memory of the router is further saved.

Specific manners of operations of individual modules described above are similar to the methods described above, and thus will not be repeated.

In exemplary embodiments, there is also provided a device for starting an application. The device includes a processor and a non-transitory computer-readable storage medium storing instructions that, when executed by the processor, cause the processor to perform a method consistent with embodiments of the present disclosure.

Figure 5:
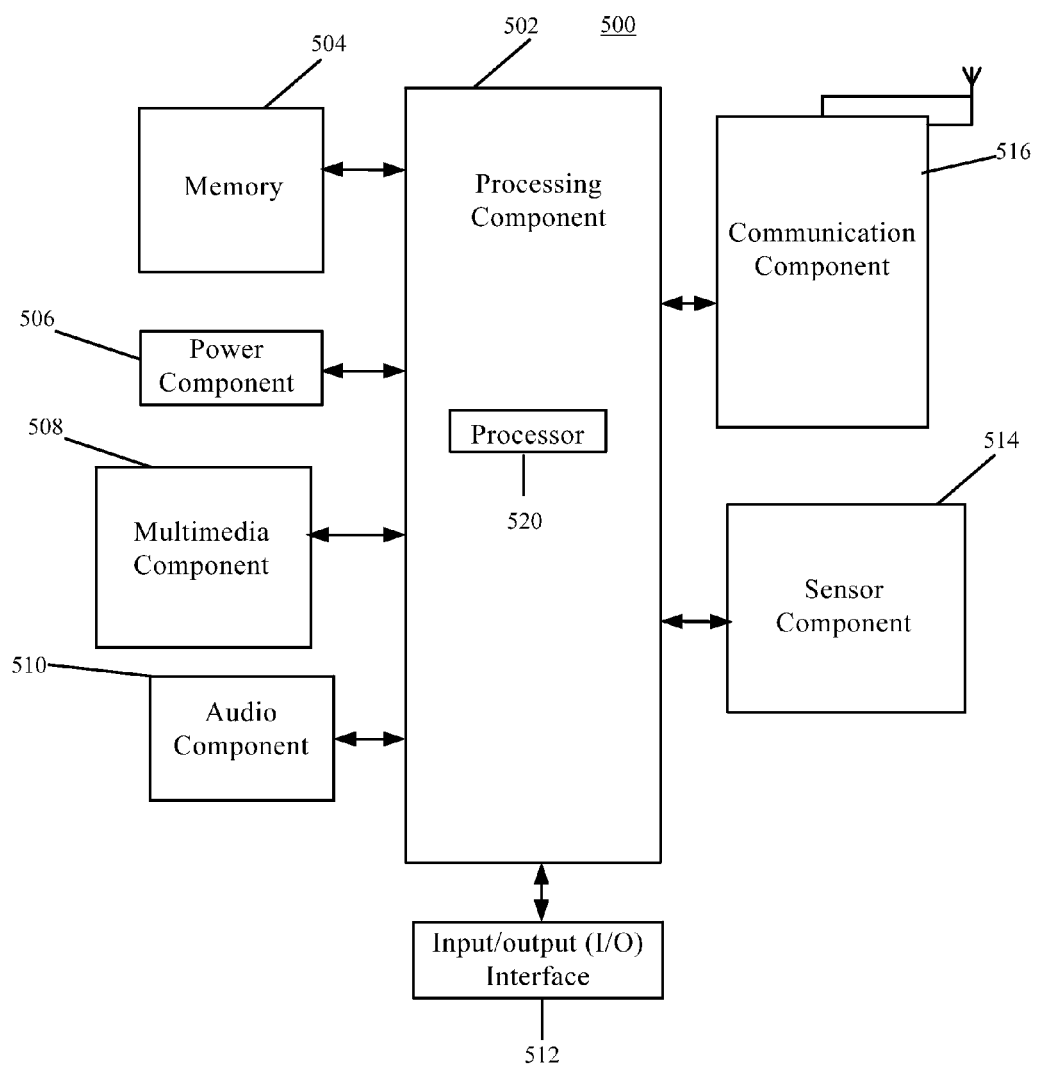
FIG. 5 is a block diagram of a device for starting an application, according to another exemplary embodiment.

FIG. 5 is a block diagram of a device 500 for starting an application, according to another exemplary embodiment. For example, the device 500 may be a router or the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the methods consistent with embodiments of the present disclosure. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, 3G, or 4G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 500, for performing the methods consistent with embodiments of the present disclosure. For example, the non-transitory computer-readable storage medium may be a ROM, a RAM, a CD-ROM, a magnetic tape, a floppy disc, an optical data storage device, or the like.

According to the present disclosure, an application based on a private protocol in a router is started after the router establishes a connection with a terminal supporting the private protocol. As such, the router does not need to waste memory resources to run the application when the router is not connected to any terminal that supports the private protocol.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for starting an application in a router, comprising:
    establishing a connection with a terminal;
    detecting whether the terminal supports a private protocol by:
        acquiring and adding a host name of the terminal into a Dynamic Host Configuration Protocol (DHCP) configuration file when the terminal is connected to the router;
        reading the host name from the DHCP configuration file;
        detecting whether a name list contains a matching host type that matches the host name, the name list storing host types of terminals supporting the private protocol; and
        determining that the terminal supports the private protocol if the name list contains the matching host type; and
    starting, if the terminal supports the private protocol, an application based on the private protocol.

2. The method according to claim 1, further comprising:
    detecting, when the terminal is disconnected from the router, whether there is another terminal supporting the private protocol being connected to the router; and
    closing, if there is no other terminal supporting the private protocol being connected to the router, the application based on the private protocol.

3. The method according to claim 1, wherein:
    the name list is a first name list stored in the router and corresponds to a first private-protocol-based application,
    a second name list is stored in the router and corresponds to a second private-protocol-based application, and
    starting the application based on the private protocol includes:
        determining whether the matching host type belongs to the first name list or the second name list; and
        starting one of the first or the second private-protocol-based application based on one of the first or the second name list the matching host type belongs to.

4. The method according to claim 1, further comprising:
    deleting the host name of the terminal from the DHCP configuration file when the terminal is disconnected from the router.

5. A router, comprising:
    a processor; and
    a memory storing instructions that, when executed by the processor, cause the processor to:
        establish a connection with a terminal;
        detect whether the terminal supports a private protocol by:
            acquiring and adding a host name of the terminal into a Dynamic Host Configuration Protocol (DHCP) configuration file when the terminal is connected to the router;
            reading the host name from the DHCP configuration file;
            detecting whether a name list contains a matching host type that matches the host name, the name list storing host types of terminals supporting the private protocol; and
            determining that the terminal supports the private protocol if the name list contains the matching host type; and
        start, if the terminal supports the private protocol, an application based on the private protocol.

6. The router according to claim 5, wherein the instructions further cause the processor to:
    detect, when the terminal is disconnected from the router, whether there is another terminal supporting the private protocol being connected to the router; and
    close, if there is no other terminal supporting the private protocol being connected to the router, the application based on the private protocol.

7. The router according to claim 5, wherein:
    the name list is a first name list stored in the router and corresponding to a first private-protocol-based application,
    a second name list is stored in the router and corresponds to a second private-protocol-based application, and
    the instructions further cause the processor to:
        determine whether the matching host type belongs to the first name list or the second name list; and
        start one of the first or the second private-protocol-based application based on one of the first or the second name list the matching host type belongs to.

8. The router according to claim 5, wherein the instructions further cause the processor to:
    delete the host name of the terminal from the DHCP configuration file when the terminal is disconnected from the router.

9. A non-transitory computer-readable storage medium storing instructions that, when executed by a processor in a router, cause the router to:
    establish a connection with a terminal;
    detect whether the terminal supports a private protocol by:
        acquiring and adding a host name of the terminal into a Dynamic Host Configuration Protocol (DHCP) configuration file when the terminal is connected to the router;
        reading the host name from the DHCP configuration file;
        detecting whether a name list contains a matching host type that matches the host name, the name list storing host types of terminals supporting the private protocol; and
        determining that the terminal supports the private protocol if the name list contains the matching host type; and
    start, if the terminal supports the private protocol, an application based on the private protocol.

* * * * *